United States Patent

Harris, Sr. et al.

[15] 3,641,822
[45] Feb. 15, 1972

[54] FLUID SAMPLE INJECTION VALVE

[72] Inventors: Rano J. Harris, Sr., 1945 Carolyn Sue Drive, Baton Rouge, La. 70815; Rano J. Harris, Jr., 9880 South Riveroaks, Baton Rouge, La. 71104

[22] Filed: Oct. 1, 1969

[21] Appl. No.: 862,903

[52] U.S. Cl. ........................................................73/422 GC
[51] Int. Cl. ....................................G01n 1/00, G01n 1/22
[58] Field of Search ..............................73/422, 422 GC, 23.1; 137/624.11, 624.14; 251/249; 222/325, 365, 61

[56] References Cited

UNITED STATES PATENTS

| | | | |
|---|---|---|---|
| 3,118,300 | 1/1964 | Jenkins | 73/422 X |
| 3,358,140 | 12/1967 | Curran et al. | 73/23.1 X |
| 3,475,950 | 11/1969 | Ferrin | 73/422 X |

Primary Examiner—Louis R. Prince
Assistant Examiner—William A. Henry, II
Attorney—Llewellyn A. Proctor

[57] ABSTRACT

A valve which is employed to simplify and expedite injection of accurately measured fluid specimens into analytical instruments. The valve embodies a chamber for receiving an accurately measured fluid specimen, and a pair of oppositely disposed tubular members, spaced apart one from the other, extending to an opening within the said chamber. In one embodiment, the fluid specimens are contained and sealed within tubular-shaped cartridges by use of end plugs, completely closed at one end but containing a partial opening extending axially from the other end to the side of a plug. Cartridges and plugs are placed within the bore of the coaxially aligned tubular members alternately, one plug abutting and closing via exposure of a solid wall to an end of the cartridge while the open end of another coincides with the axial opening through the cartridge. On transport at desired intervals through the bore of the coaxially aligned tubular members, the fluid contents of the cartridges are discharged to the chamber. In a more preferred embodiment, reciprocable plungers with fixed end seals are mounted, one within each of a pair of tubular members. One tubular member contains a plunger which is used to cover and uncover, i.e., close and open, and also to seal off the opposite tubular member from the entry to the chamber, said other tubular member containing a volume for carrying an accurately measured quantity of the fluid and a plunger which is used to displace the fluid specimen to the chamber.

9 Claims, 6 Drawing Figures

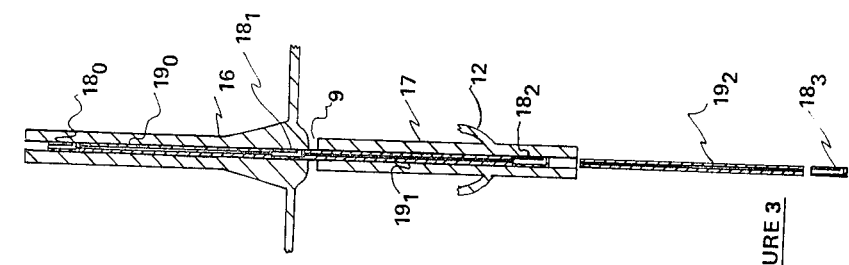
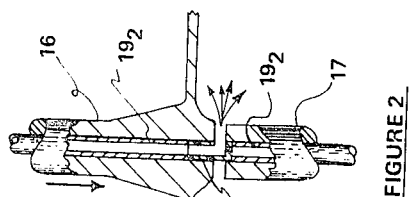
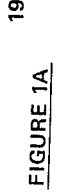
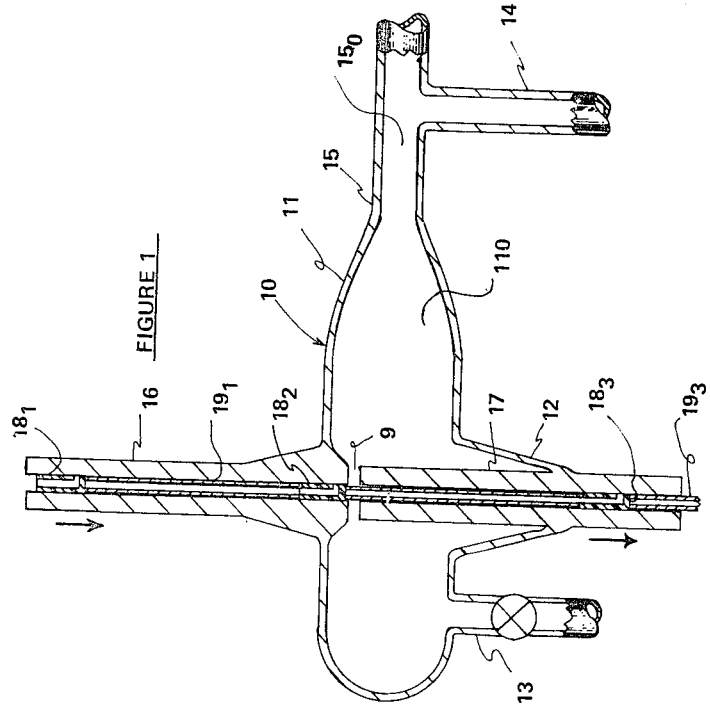

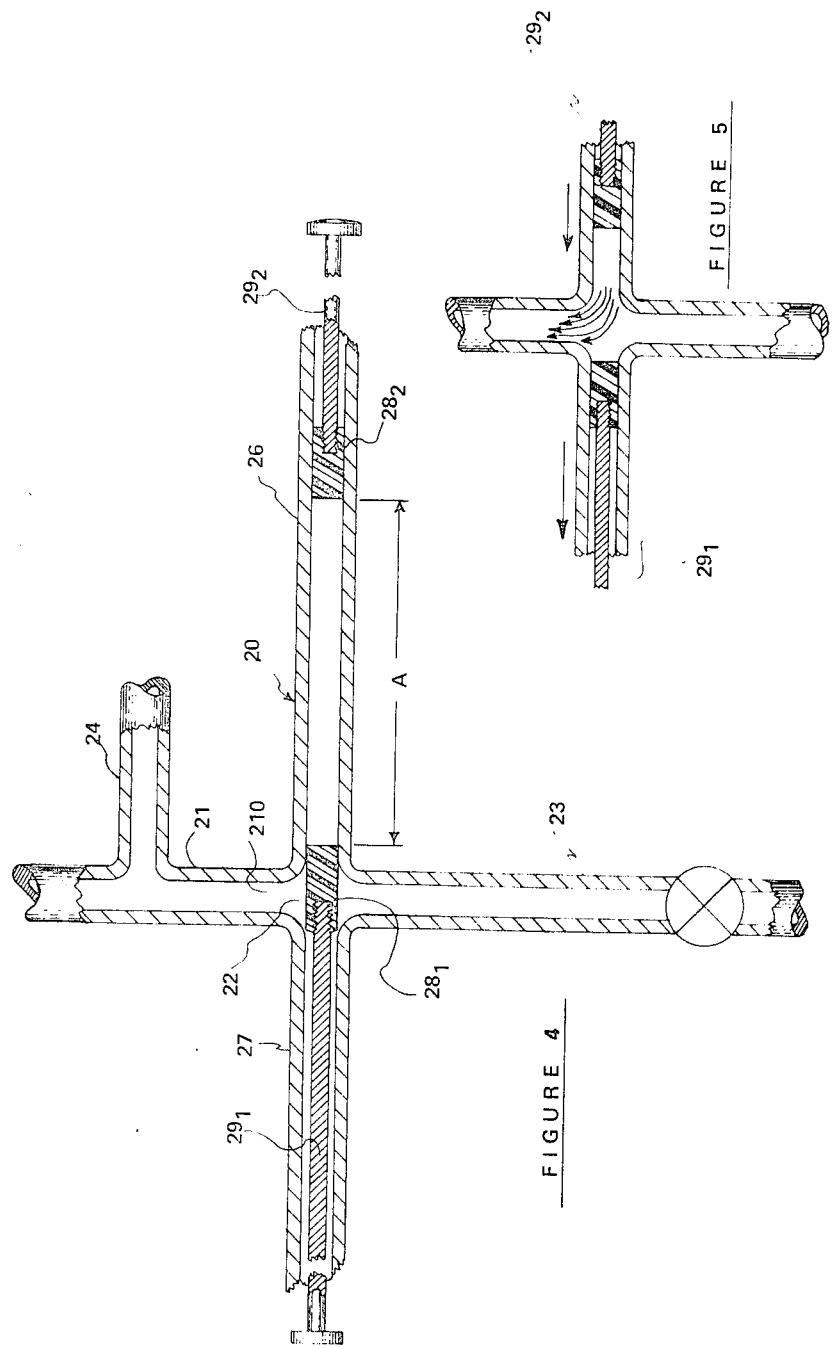

FLUID SAMPLE INJECTION VALVE

Sample inlet systems of various types are known for use in injecting fluids, i.e., gases and liquids, to analytical instruments, e.g., gas chromatographs, mass spectrometers and the like. In all such systems, extremely high precision and accuracy are essential inasmuch as the volume or weight of the fluids injected and analyzed are often measured in tenths, hundredths, thousandths or even millionths of a cubic centimeter, or milligram. Generally, elaborate apparatus is required to prevent contamination or loss of the sample injected into the instrument.

Inlet systems for such analytical instruments include a chamber wherein the fluid specimen is injected for transport or conveyance through a conduit to the analyzer portion of the instrument, which is generally under vacuum via operative connection of the conduit with a vacuum pump. On the opposite side of the chamber is provided an injection station. Between the injection station and the chamber is generally provided another valved conduit to which is connected a second vacuum pump. A fluid specimen is introduced at the injection station which requires a separation device, or series of chambers to separate the chamber from the outside environment.

While such systems have proven generally satisfactory, they are nonetheless more complex, less maintenance-free, and more costly than desired.

It is accordingly the primary objective of the present invention to obviate the foregoing and other prior art difficulties.

In particular, it is an object to provide a new, improved and greatly simplified sample inlet system of high precision and accuracy for measurement and injection of fluid specimens directly into analytical devices.

These and other objects are accomplished in accordance with the present invention comprising a new and improved sample inlet system, or valve, which provides an expeditious means for injection of accurately measured fluid specimens—, liquids or gases—into analytical instruments. Such valve, in all embodiments, includes a chamber for receiving an accurately measured fluid specimen, and a pair of oppositely disposed tubular members, spaced apart one from the other, extending to and opening within the said chamber.

In a first embodiment, accurately measured fluid specimens are contained within separate cartridges introduced into and passed, at desired time intervals, through the bore of one tubular member of the pair to the other, whose bore is coaxially aligned with and preferably of uniform diameter with respect to the other. The fluid contents of the individual tubular shaped cartridges are contained through use of end plugs, preferably separate from the cartridges. The individual plugs are closed at one end but contain a partial opening extending axially from the other end to a side of the plug. Cartridges and plugs are placed within the bore of the coaxially aligned tubular members alternately, one plug end abutting, sealing and closing an end of the cartridge while the open end of another coincides with the axial opening through the cartridge. The latter end is sealed via contact of the side opening with the inside wall of the tubular member. On movement past the space or opening between the pair of tubular members the side opening of a plug is uncovered, the seal broken, and the fluid contents of a cartridge are discharged or flashed through the opening between the tubular members into the chamber. On subsequent movement of a succeeding cartridge to the opening for discharge, the preceding cartridge and end plugs are transported to the second tubular member of the pair for discharge.

In a more preferred embodiment, reciprocable pistons or plungers are mounted, one within each of the pair of oppositely disposed tubular members. One tubular member, or the first member of the pair, carries a plunger which is used to cover and uncover, i.e., close and open, the opening to the chamber and also to seal the end of the oppositely disposed tubular member, or second member, at the location of entry to the chamber. The said oppositely disposed, or second, tubular member of the pair contains a volume for carrying an accurately measured fluid specimen and a plunger for use in displacing the fluid into the opening to the chamber upon withdrawal of the sealing plunger of the first tubular member therefrom, and away from the opening to the chamber.

These and other features and advantages of the invention will be better understood by reference to the following more detailed description which makes reference to the attached drawings.

Referring to the drawings:

The first four figures depict cross-sectional elevation views of a first embodiment of the fluid sample injection system, or valve, in accordance with this invention, these figures taken in sequence showing in FIG. 1, the charging of a tubular shaped cartridge containing an accurately measured portion of a fluid specimen, to the injection system for delivery to an analytical instrument;

FIG. 1A, the detail of a suitable combination of plugs and cartridges, for use in such delivery;

FIG. 2, which is a fragmentary view of FIG. 1, the positioning of the cartridge at the moment of actual injection; and FIG. 3, also a fragmentary view of the first figure, the ejection of the empty cartridge, and the reloading of a fresh cartridge.

The remaining figures depict cross-sectional elevation views of a preferred form of valve, provided with a pair of mounted reciprocable plungers, with forward seals, for measurement and injection of fluid specimens, these figures taken in sequence showing and describing in FIG. 4, sample preparation and measurement; and FIG. 5, injection of the measured fluid specimen into the analytical instrument.

Referring to the drawings, the fluid sample injection system or valve embodied by FIGS. 1 through 3 is designated generally by reference character 10. Such valve assembly includes an enlarged chamber 110 formed by the enclosing wall 11, and a smaller adjoining chamber 150 formed by the enclosing wall 15 which leads into an analytical instrument, e.g., a mass spectrometer or gas chromatograph, not shown. A line 14, leading to a vacuum pump (not shown) provides a suitable vacuum, and an optional valved line 13 provides an inlet for carrier gas, if desired. The lower portion of chamber 110 is drawn outwardly, and a rigidly supported female or tubular member 17 is contained within wall 12. A tubular member 16, spaced apart from, but coaxially aligned upon, tubular member 17 is similarly supported within wall 11. The positioning and arrangement of the pair of tubular members 16,17 within chamber 110, taken with the combination of plugs 18 and tubes or cartridges 19, and the annular opening 9 provided between tubular members 16,17, provide a lock or valve mechanism by virtue of which micro and semimicro quantities of accurately measured fluid specimens contained within the cartridges 19 can be separately introduced into chamber 110.

It is to be observed, preferably by specific reference to FIG. 1A, that a cartridge 19—viz, $19_0$, $19_1$, $19_2$, $19_3$—is a tubular member of calibrated length and volume, or a tared member, of desired size, into which an accurately measured fluid specimen can be introduced. Moreover, it is to be observed that a plug 18—viz, $18_0$, $18_1$, $18_2$, $18_3$—is provided with an axial opening cut only part way through the member to a side opening. Thus, e.g., a plug $18_3$ is provided with an axial opening $18_{3A}$ which adjoins the side opening $18_{3B}$. The front end of the plug $18_3$ thus comprises an enclosed wall $18_{3C}$. In operation of the valve 10, the plugs 18 and cartridges 19 are alternately placed within the bore of tubular members 16,17 and an enclosed wall end of a plug 18 is always fitted against the end of a cartridge 19. The arrows represent the direction of movement of the plugs 18 and cartridges 19 in passage through tubular members 16,17. The forward wall $18_{3C}$ thus abuts the end of cartridge $19_3$ and openings $18_{3A}$, $18_{3B}$ are matched with opening $19_{2A}$ of cartridge $19_2$.

In describing an operation, specific reference is made to FIG. 1 wherein it is to be assumed that cartridge $19_1$ contains an accurately measured quantity of a fluid specimen. The fluid is contained in place by means of plugs $18_1$ and $18_2$. On the one hand, fluid cannot escape opposite the direction of movement because of the capping action of $18_1$, the forward wall of which closes the capillary bore of the cartridge $19_1$. On the other hand, fluid cannot escape forward because the tightness of the plug within the bore of tubular member 16 closes and seals the side opening of plug $18_2$. The fluid contents of members $19_2$ and $19_3$ have already been discharged. To inject the fluid specimen from cartridge $19_1$, the cartridge $19_1$ is simply pushed downward, e.g., by another capped cartridge, to the position shown in FIG. 2.

As shown by reference to FIG. 2, the side opening of plug $18_2$ comes into alignment with the annular opening 9 and fluid from cartridge $19_1$ is flashed into the chamber 110. Where desired, the valved line 13 is opened and a carrier gas is used to sweep the gas from chamber 110 into chamber 150 wherein it is conveyed to an analytical instrument. Such feature is generally desirable where the analytical instrument is, e.g., a gas chromatography, but not desirable when, e.g., the analytical instrument is a mass spectrometer.

The discharged cartridge $19_1$ is then, as shown by reference to FIG. 3, displaced downwardly and finally ejected from the terminal end of tubular member 17, a new cartridge $19_0$ being moved into the former position of cartridge $19_1$. The sequence can be repeated ad infinitum.

A more preferred form of valve, and an operating sequence thereof, is shown by reference to FIGS. 4 and 5. This valve, designated generally by reference character 20, includes a chamber 210 of any desired size and shape, e.g., as formed by an enclosing wall 21, of circular cross section, which leads to an analytical instrument (not shown). An optional valved line 23 provides a source of carrier gas and the line 24 leads to a vacuum pump (not shown). A pair of lines 26,27 provided with reciprocable plungers and fixed end seals, affixed perpendicular to and adjoining the wall 21 (an optionally the wall 23) provides means of accurately measuring and injecting fluid specimens into the chamber 210 for analysis.

Referring specifically to FIG. 4, the distance or Volume A in line 26, between the face of the plunger seals $28_1, 28_2$ is calibrated or carefully measured. Indicia marks (not shown) can be scribed on the surface for visual observation of the volume of fluid specimen charges, where a transparent construction material is used. Alternatively, also, a specimen can be measured externally and deposited within this portion of line 26 as via injection from a needle syringe.

In a typical operation, the seal $28_1$, by movement of plunger $29_1$, is fitted within line 26 to cover entry 22 to chamber 210. The plunger $29_2$ is completely withdrawn from line 26 and an accurately measured fluid specimen is injected into the line to fill volume A. Plunger $29_2$ is then replaced in line 26. At the desired time of injection, plunger $29_1$ is withdrawn to the left and back into line 27; entry 22 is thereby opened, and plunger $29_2$ is moved to the left to displace and discharge the fluid specimen into chamber 210 as shown by reference to FIG. 5. Optionally, carrier gas is passed through line 23 to sweep the fluid specimen into chamber 210 and to the analytical instrument.

Various materials of construction are suitable in formation of the various apparatus of the present invention. Suitably, the walls of the injection systems described can be of conventional valve materials, preferably metals such as brass, copper, bronze, chrome, ferrous metals, stainless steel, and the like. More preferably, however, glass is used thus offering the advantages of low cost, simplicity of construction, ease of cleaning and transparency. The tubular-shaped cartridges and plungers are preferably constructed of metal, preferably metals such as brass, copper, bronze, nichrome, stainless steel, glass, and the like.

The plugs, employed in conjunction with the cartridges, and the plunger seals are constructed of resilient elastic materials such as hard rubber, natural or synthetic, e.g., neoprene, isoprene, chloroprene, and various plastics and plasticlike materials, e.g., nylon, orlon, dacron, and conventional gasket and gasket diaphragm materials. Preferably, these materials are lubricated.

The semirigid self-lubricated plastics are especially preferred as plugs and seals. The poly fluorinated ethylene polymers, notable among which is polytetrafluoroethylene (Teflon), are particularly outstanding. An especially preferred technique for formation of the plunger seals is such as described in copending application Ser. No. 762,791, the subject matter of which is hereby incorporated by way of cross-reference.

The length and diameter of the tubular-shaped cartridges are not critical, but it is to be understood of course that the advantages attained are primarily associated with the measurement and dispensing of micro and semimicro quantities of fluid, e.g., perhaps a few tenths, a few hundredths, or even a few thousandths of a cubic centimeter of volume, or milligrams. For this reason, the internal diameter of a cartridge is quite small, generally of capillary size, often ranging no higher than about 0.01 to about 0.06 inch in diameter and no more than about 1 or 2 inches in length. While, of course, length and internal diameter are directly related to the volume of fluid desired, these dimensions are not critical. Generally, the walls of the cartridge are also quite thin, for ease of heat transfer, and so even the outside diameter of the cartridge is relatively small. Desirably, the plugs used are fitted separately against a cartridge, rather than being made integral therewith, to facilitate filling of the cartridges. The outside diameter of these plugs necessarily is equal to or preferably slightly greater than the diameter of the bore through the tubular member of entry to the chamber to provide a tight seal. Preferably, the cartridge per se is of slightly smaller outside diameter than the internal diameter of said bore to permit freedom of movement therethrough.

The internal diameter of the tubular members carrying the reciprocable plunger is likewise quite small, the tube providing the calibrated fluid specimen, in particular, ranging in diameter and length approximating that of the capillary opening within a cartridge, supra. The seals are equal to or larger than the capillary openings, and the plunger diameters are slightly smaller. The walls of the tubular members vary in thickness dependent upon the mechanical strength desired and the amount or degree of heat transfer desired. An advantage of constructing the latter embodiment is that the "T" or cross shape is readily enclosed within a heater or heater block to facilitate ultimate displacement of the contained specimen to the chamber.

Although a limited number of embodiments of the invention have been illustrated in the accompanying drawings and described in the foregoing specification, it is apparent that various changes, such as in absolute or relative dimension of the parts, materials used, and the like, as well as the suggested manner of use of the apparatus of the invention, can be made therein without departing from the spirit and scope of the invention, as will now be apparent to those skilled in the art.

Having described the invention, what is claimed is:

1. In combination, a valve suitable for use in injecting a fluid specimen into an analytical instrument comprising
 a pair of oppositely disposed tubular members extending within the a chamber, the terminal ends thereof being spaced apart one from the other so that the bores of the said tubular members open into the chamber,
 tubular shaped cartridges, provided with fluid specimens sealed therein via end plugs, closed at one end and containing an opening through the other which extends to the side of the plug,
 whereby cartridges and caps can be placed alternately in series within the bore of a first of the tubular members, one cap abutting and closing an end of a preceding cartridge while the open end coincides with the axial opening through the cartridge, the side opening of a cap being closed and sealed by the presence of the surrounding tubular member until such time as the series of caps and cartridges is moved through the bore and the cap emerges into the opening between the said tubular members whereupon the seal is broken and the fluid contents of the cartridge is discharged into the chamber, and the empty cartridge can then be passed into the bore of the second tubular member and then discharged.

2. The apparatus of claim 1, wherein the oppositely disposed tubular members are provided with bores of uniform diameter.

3. The apparatus of claim 1, wherein the plugs are separate from the cartridges, and are constituted of Teflon.

4. The apparatus of claim 1, wherein the chamber is provided with an inlet for carrier gas.

5. In combination, a valve suitable for use in injecting a fluid specimen into an analytical instrument comprising a chamber for receiving an accurately measured fluid specimen, a chamber outlet through which the fluid specimen can be conveyed into the said analytical instrument, a pair of oppositely disposed tubular members extending within the said chamber, the terminal ends thereof being spaced apart one from the other so that the bores of the tubular members open into the chamber, a reciprocable plunger mounted within the bores of each of the pairs of oppositely disposed tubular members, one plunger being employed to cover and uncover the opening to the chamber and also to seal a terminal end of the oppositely disposed tubular member at the location of entry to the chamber, while the other tubular member contains a volume for carrying an accurately measured quantity of a fluid specimen and a removable, reciprocable plunger for displacing the fluid to the chamber when the oppositely mounted plunger is retracted to uncover the opening to the chamber.

6. The apparatus of claim 5, wherein the forward ends of each of the plungers is provided with seals which fit snugly into the bores of the said tubular members.

7. The apparatus of claim 6, wherein the seals are constituted of Teflon.

8. The apparatus of claim 5, wherein the chamber and the pair of tubular members are constituted of glass.

9. The apparatus of claim 5, wherein the chamber is provided with an inlet for carrier gas.

* * * * *